(12) United States Patent
Pompier et al.

(10) Patent No.: US 7,287,564 B2
(45) Date of Patent: Oct. 30, 2007

(54) TIRE SAFETY SUPPORT AND RIM AND SUPPORT ASSEMBLY CONTAINING CENTERING MEANS AND WITH FACILITATED MOUNTING

(75) Inventors: Jean-Pierre Pompier, Volvic (FR); Jean-Jacques Drieux, Volvic (FR); Jean-Charles Lacour, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 272 days.

(21) Appl. No.: 10/462,284

(22) Filed: Jun. 16, 2003

(65) Prior Publication Data

US 2003/0209301 A1    Nov. 13, 2003

Related U.S. Application Data

(62) Division of application No. 09/704,182, filed on Nov. 1, 2000, now Pat. No. 6,598,633.

(60) Provisional application No. 60/186,463, filed on Mar. 2, 2000.

(30) Foreign Application Priority Data

| Nov. 4, 1999 | (FR) | 99 13963 |
| Dec. 23, 1999 | (FR) | 99 16434 |
| Jan. 27, 2000 | (FR) | 00 01079 |

(51) Int. Cl.
   *B60C 17/04*   (2006.01)

(52) U.S. Cl. ............... 152/158; 152/520; 152/384

(58) Field of Classification Search ............ 152/158, 152/520, 384, 386, 387, 393, 323
See application file for complete search history.

(56) References Cited

U.S. PATENT DOCUMENTS

| 712,179 A * | 10/1902 | Connable ............... 152/387 |
| 1,084,409 A * | 1/1914 | Divine ............... 152/323 X |
| 4,252,170 A | 2/1981 | Watts |
| 5,194,104 A | 3/1993 | Wada et al. |
| 5,634,993 A | 6/1997 | Drieux et al. |
| 5,690,762 A | 11/1997 | Bock et al. |
| 5,836,366 A | 11/1998 | Muhlhoff |
| 5,891,279 A * | 4/1999 | Lacour ............... 152/520 |
| 6,415,839 B1 * | 7/2002 | Pompier et al. ........ 152/520 X |

FOREIGN PATENT DOCUMENTS

| EP | 0796747 | 9/1997 |
| FR | 2 588 802 A1 | 4/1987 |
| FR | 2588802 | 4/1987 |
| JP | 7149118 | 6/1995 |

OTHER PUBLICATIONS

Japanese Abstract of 07149118, published Jun. 13, 1995.

* cited by examiner

*Primary Examiner*—Adrienne C. Johnstone
(74) *Attorney, Agent, or Firm*—Fitzpatrick, Cella, Harper & Scinto

(57) ABSTRACT

A safety support designed to be inserted by a translation operation around a rim bearing in which the radially inner surface of the base of the support contains a plurality of protuberances radially arranged internally.

3 Claims, 6 Drawing Sheets

TIRE SAFETY SUPPORT AND RIM AND SUPPORT ASSEMBLY CONTAINING CENTERING MEANS AND WITH FACILITATED MOUNTING

BACKGROUND OF INVENTION

This application is a division of U.S. patent application No. 09/704,182, filed Nov. 1, 2000, which issued on Jul. 29, 2003 as U.S. Pat. No. 6,598,633; which claims the benefit of U.S. Provisional Patent Application No. 60/186,463, filed Mar. 2, 2000.

The present invention concerns vehicle tire safety supports that are mounted inside the tires, on their rims, in order to carry the weight in case of tire failure. In particular, it concerns the connection between those safety supports and the rims on which they are mounted.

The main function of the safety supports is to carry the weight in case of severe loss of inflation pressure of the tire. When tires are inflated normally, the safety supports should interfere with the dynamic properties of the tires as little as possible. In particular, they should remain well centered around the rim in order to avoid any unbalance effect, whatever the temperature of the support and the traveling speed of the vehicle. They should also be capable of being mounted on the rims of vehicle wheels and demounted easily.

U.S. Pat. No. 5,690,762 relates to a safety support made of an elastic material designed to be mounted on a well-base rim of an ordinary passenger vehicle. This support contains a body and a base designed to come in contact with the rim. The support further includes annular reinforcements circumferentially oriented and appreciably inextensible, the radius of which is slightly greater than the radius of the flange of the rim for which the support is provided. The base consists of two annular zones, whose inner radius in free state is less than that of the part of the rim on which they must bear; the compression of these annular zones therefore ensures good centering of the support on the rim. The function of the annular reinforcements is, notably, to prevent the annular zones from stretching, by reason of high-speed centrifugal forces, until losing contact with the rim.

When a safety support is designed to equip a rim in two parts or a rim possessing a bearing for a support, the radius of which is greater than that of one of the rim flanges, as shown in FIG. 1, the safety support is mounted by insertion of the support on the corresponding rim bearing. One can refer to U.S. Pat. No. 5,836,366 which describes a method of mounting an assembly made up of a tire and tread support on such a wheel rim bearing. It is important for the support to be well centered on the rim bearing while maintaining easy mounting and demounting, as well as satisfactory endurance.

On the other hand, when annular reinforcements are necessary to withstand centrifugal forces, the annular reinforcements can be placed in the base. This is the case with the support disclosed by application EP 0,796,747 A1. Such a position of the annular reinforcements facilitates the manufacture of the support.

For such a support, taking into account the manufacturing tolerances of the rim and support, it is no longer possible to use radially inner annular zones, the compression of which ensures good centering on the rim, whatever the speed, while ensuring easy mounting and demounting.

"Equatorial plane" of a safety support is understood to be any plane perpendicular to the axis of rotation of the support and "mid-equatorial plane" is understood to be the equatorial plane placed in the middle of the support.

The "axial plane" of a support or wheel is understood to be any plane passing through the axis of rotation of the support or wheel.

SUMMARY OF THE INVENTION

According to a first aspect, the object of the invention is a safety support designed to be inserted by a relative translation operation on a wheel rim bearing, said support having an axially front face and an axially back face and containing a base intended to fit around said bearing as well as a body connected to said base, said bearing having an engagement edge and said translation operation consisting of moving the engagement edge of the rim bearing of said axially front face of the support toward said axially back face, characterized in that the radially lower surface of the support presents a plurality of circumferentially distributed centering protuberances, each of said centering protuberances possessing in section through an axial plane at least one portion of a radially inner profile, whose distance from the axis of the support gradually diminishes in the axial direction between a value exceeding the radius of the engagement edge of the rim bearing on the front side of the support and a value less than that radius toward the back side of the support, in order to permit a friction engagement between the rim and the support.

The presence of the centering protuberances makes it possible to bring about their compression with extension of the support upon its insertion around the rim bearing. This ensures good centering of the support in relation to the rim. The particular shape of said protuberances further makes it possible to transform them into actual guides of the support, which markedly facilitates mounting on the bearing, notably, in the zone of the support where, by reason of the thickness of the protuberance, mounting results in a compression of the latter.

According to a second aspect, the invention concerns a similar safety support in which each of said centering protuberances possesses in section through an axial plane at least one radially inner profile portion, whose distance from the axis of the support gradually diminishes in the axial direction between a value exceeding the radius of the engagement edge of the rim bearing on the back side of the support and a value less than that radius toward the front side of the support.

This second characteristic is particularly advantageous. It markedly facilitates demounting of the support by preventing the edges of the protuberances from being stopped against any part of the rim that the protuberance must pass.

The invention also concerns a similar safety support designed to be inserted by a relative translation operation around a rim bearing, said support containing a base intended to fit around said bearing, as well as a body connected to said base, said body containing suitable zones for defining cavities separating the base and the radially outer part of the support and distributed around the support, characterized in that the radially inner surface of said base of the support presents a plurality of circumferentially distributed centering protuberances, and in that at least some of said protuberances are radially arranged internally opposite corresponding cavities in said body.

This arrangement has the advantage of limiting the variations of radial stiffness of the support as a function of the azimuth and, consequently, upon running on support, of diminishing the variations of forces sustained by the support, as well as the vibrations produced by the protuberances. This results in an appreciable improvement of endurance of these supports in operation.

According to an additional aspect, an object of the invention is a safety support of the general type in which the base contains a zone of resistance appreciably inextensible circumferentially, but flexible, the radially inner radius of which is slighter greater than the radius of the rim support bearing, as well as means for centering the support relative to the rim. This support is characterized in that the centering means consist of a plurality of circumferentially distributed protuberances radially arranged internally relative to the zone of resistance of the base and the radially inner walls of which are inscribed in free state on a radius less than the radius of the rim support bearing.

The protuberances radially arranged internally relative to the zone of resistance generate, by their radial compression, tightening stresses on mounting of the support, but also have the advantage of making possible a polygon formation of the zone of resistance that is flexible and very slightly extensible. Said polygon formation makes it possible to absorb some variation of radius of the rim support bearing or of the zone of resistance and thus ensure easy mounting of the support, while maintaining excellent resistance to centrifugal force.

The protuberances are preferably arranged symmetrically in relation to the axis of rotation of the support.

The axial width of the protuberances can range between 10 and 50% of the axial width of the base of the support.

According to a preferred embodiment, the protuberances are arranged axially on the side of the axially back face of the support.

This makes it possible to facilitate mounting by not requiring an extension of the base or, as the case may be, a polygon formation of the zone of resistance of the base at the end of mounting of the support on the rim.

The protuberances can present axially, on the side of the axially back face of the support, a lateral face whose average inclination relative to the axis of rotation of the support ranges between 15 and 55 degrees. Said lateral face facilitates demounting of the support by enabling the side of the support first leaving the rim bearing not to be stopped against the outer flange of the rim.

The straight section of the protuberances in an axial plane can be trapezoid-shaped. Preferably, α being the half-angle in the center separating two adjacent protuberances, and R being the radius of the support bearing 4 of the rim 2, the height h of a protuberance satisfies the following relation:

$$h \le R\left(\frac{1}{\cos\alpha} - 1\right)$$

When that relation is satisfied, on polygon formation of the base around the rim support bearing, there is always a zone of contact between the base and the support bearing between the two adjacent protuberances. The limiting value of the height of the protuberances corresponds to the maximum efficiency of the protuberances.

The radial height of the protuberances ranges between 2 and 10 mm and preferably between 3 and 5 mm.

The radial height of the protuberances should not be too elevated, in order not to entail, upon running on the support, the vibrations which might be detrimental to the endurance of the support. However, if these vibrations are perceptible to the driver, that can be an advantage in order to indicate that the running conditions no longer necessitate a reduction of traveling speed. A radial height in the order of 3 to 5 mm appears to be a good compromise. The effectiveness of the take-up of play linked to the polygon formation of the zone of resistance, for a given radial height of protuberances, directly depends on their number. For a radial height of 3 to 5 mm, a number of protuberances ranging between 3 and 15 makes it possible to fill all the necessary base diameter variations due to production process.

When the base of the support includes a plurality of extensions stretching axially from the opposite side to the first mounting side, the protuberances can be arranged at the same azimuths as those extensions.

The radially inner surface of said base can also at least contain, between two circumferential zones of given radius, a circumferential zone of greater radius.

This central recess of the base of the bearing facilitates its mounting and demounting by limiting friction against the rim support bearing.

The protuberances can be distributed in two assemblies axially and circumferentially offset from each other. This has the advantage, upon running on the support, of inducing a movement comparable to a camber movement. The vibrations resulting therefrom can be either directly felt by the driver of the vehicle or detected by an appropriate device.

The invention also concerns a wheel assembly containing a rim and a safety support, said support being designed to be inserted by a relative translation operation around a bearing of said rim, having an axially front face and an axially back face and containing a base intended to fit around said bearing as well as a body connected to said base, said bearing having an engagement edge and said translation operation consisting of moving the engagement edge of the rim bearing of said axially front face of the support to said axially back face, characterized in that said assembly contains a plurality of circumferentially distributed protuberances, compressed radially between the base of said support and said rim bearing in order to create an appropriate mechanical tightening between said support and said bearing and to ensure the centering of said support on said bearing.

This assembly can be such that the protuberances are arranged on the radially outer surface of the rim bearing. In that case it is advantageous for each of said centering protuberances to possess in section through an axial plane at least one radially outer profile portion whose distance from the axis of said rim gradually increases in the axial direction, going from the side of the engagement edge of said bearing to the opposite side, between a value less than the inner radius of the base of said support and a value exceeding that radius, in order to make possible a friction engagement between the rim and the base of the support.

DESCRIPTION OF THE DRAWINGS

Several embodiments of the invention are now described by means of the attached drawing in which.

DESCRIPTION OF PREFERRED EMBODIMENTS

Figure 1:
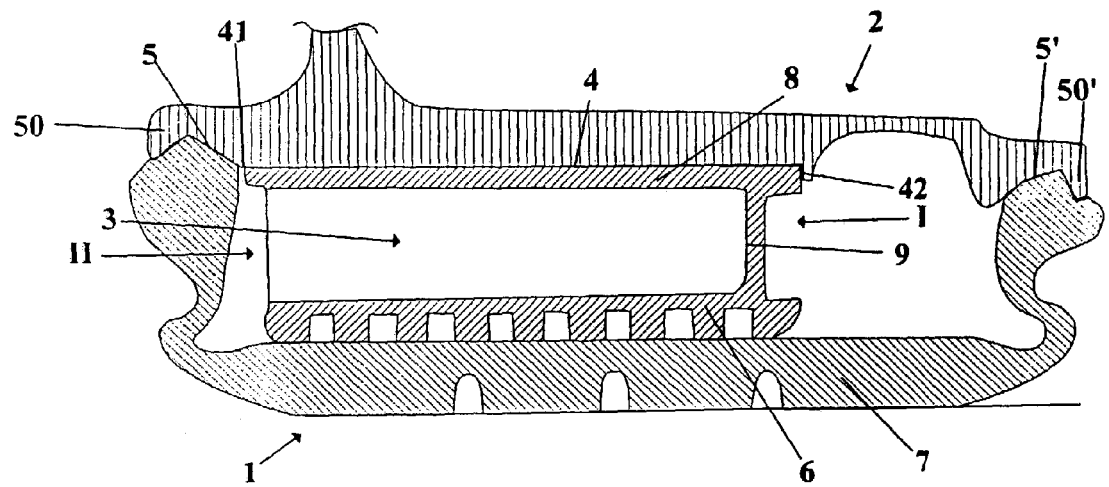
FIG. 1 presents a partial axial section of a mounted assembly equipped with a safety bearing.

FIG. 1 shows a mounted assembly containing a tire 1, a wheel rim 2 and a safety support 3 arranged around the bearing 4 of the rim 2. The particular geometry of said rim 2 is, notably, described in U.S. Pat. No. 5,634,993. It presents two rim flanges, 50 outer and 50' inner, two bead seats, 5 outer and 5' inner, of different radii and a bearing 4 with an engagement edge 41 and a stop 42. This rim is particularly suited for easy placement of the safety support 3. This assembly makes rolling possible in spite of a considerable pressure drop in the tire 1. The safety support 3 has an axially front face I and an axially back face II. The support consists of two main parts, a base 8 designed to extend around the bearing 4 of the rim 2 and a body 9 connected to the base 8. The body 9 contains a crown 6 intended to come in contact with the tread 7 of the tire in case of little or no inflation pressure—this is what is represented in FIG. 1. The body 9 can take extremely varied shapes.

The geometry of the rim 2 is particularly suited for easy mounting of the safety support 3 by insertion of the latter around the bearing 4. This insertion is carried out by a relative axial translation movement between the support and the bearing. The translation movement consists of shifting the engagement edge 41 of the bearing 4 of the axially front face I of the support 3 toward the axially back face II up to the stop 42.

Figure 2:
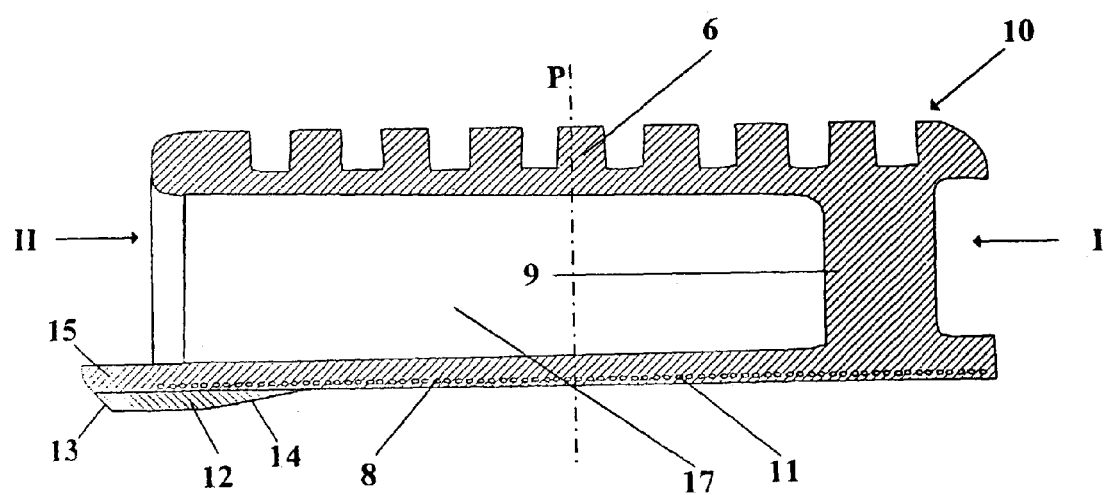
FIG. 2 presents an axial section of a support according to the invention.

FIG. 2 presents a schematic view in partial axial section of a support 10 similar to that of FIG. 1, in which a reinforcing structure has been optionally incorporated, intended to take up the stresses due to centrifugal force on rolling at high speed. This structure comprises in this example a reinforcing ply 11 appreciably inextensible circumferentially, placed in the base 8. The structure constitutes the "zone of resistance" of the base 8, that is, the zone of the base appreciably inextensible circumferentially. This structure can consist of reinforcements such as wires, cords, assemblages or the like made, for example, of aramide or nylon. The reinforcing structure can also consist of a circumferential winding of reinforcements in one or more layers; it can also by a crossed double ply whose reinforcements are oriented at angles ±α; α in the order of 10 to 40 degrees relative to the circumferential direction in order to guarantee good resistance to the centrifugal force of the support on running at high speed.

Figure 3:
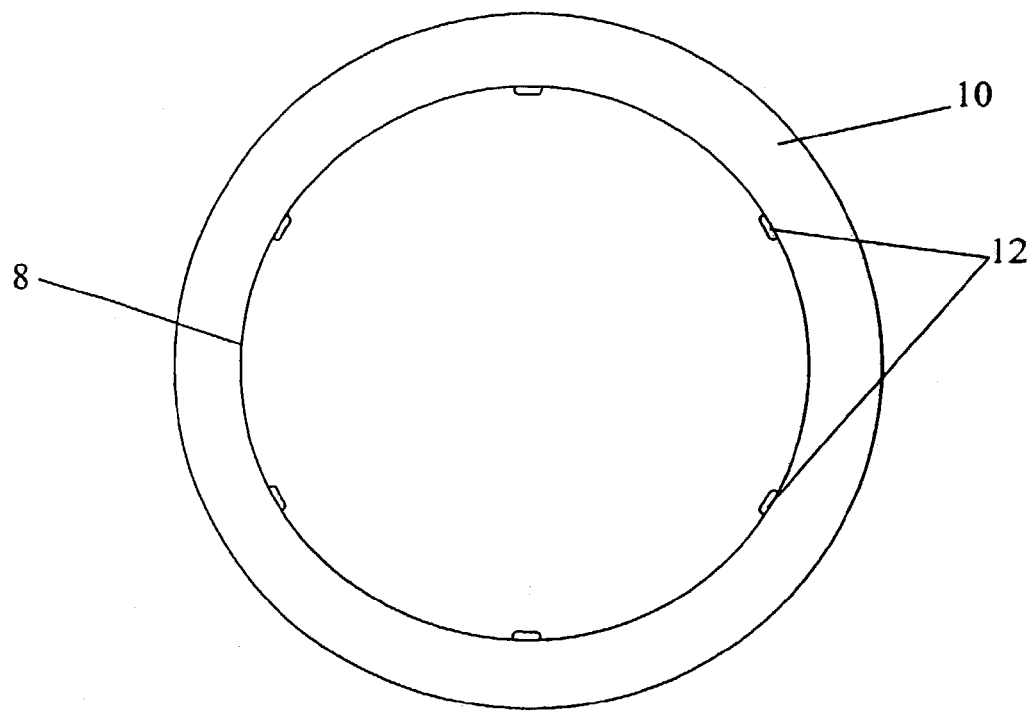
FIG. 3 presents the support of FIG. 2 in side view.

This support 10 comprises a set of protuberances 12 radially arranged internally relative to the base 8. As FIG. 3 shows, those protuberances are regularly distributed all around the inner circumference of the base 8. Their number here is 6. The protuberances have a thickness of 3 to 5 mm and a circumferential length in the order of 3 to 5 cm. The protuberances are arranged here on only one side of the support, on side II of the mid-equatorial plane P. Side I is the one first inserted around the support bearing 4 of the rim 2 (see FIG. 1). The protuberances arranged on side II are therefore in contact with the support bearing 4 only at the end of the mounting operation. This makes it possible to reduce the necessary mounting stresses. The straight section of those protuberances is appreciably trapezoidal. They contain a first lateral face or bias 14 arranged toward side I. This first bias 14 forms a narrow angle in the order of 15 to 20 degrees with the direction of the angle of rotation of the support. The bias 14 facilitates the progressive placement of the support around the rim. A second bias 13 is arranged on the outer side II to facilitate demounting of the support. This bias has an average inclination in the order of 45 degrees. In the example presented in FIG. 2, the base 8 also presents a set of circumferentially discontinuous extensions 15 intended to be supported against the outer bead of the tire 1 and thus axially block the support 10. These extensions 15 are circumferentially discontinuous in order to permit easy demounting of the tire 1 from its rim 2. The extensions and the protuberances are arranged at the same azimuths and bear on one another, as shown in the section of FIG. 2.

It is also possible to place these protuberances on both sides of the support.

The role of the protuberances is now described in the case of a support containing a reinforcing structure at its base.

This role of the protuberances 12 is twofold. Their first function is to generate radial tightening and centering stresses on mounting of the support 10 on the support bearing 4 of the rim 2. For a given radius $R_A$ of the reinforcing structure 11, the support 10 can be mounted on any support bearing 4 whose radius R lies (the radius $R_A$ can be practically merged with the inner radius of the base 8) roughly between $R_A$ and $R_A$–h, where h is the radial height of the protuberances. For $R \geqq R_A$, the support cannot be mounted, and for $R < R_A$–h, the play is irretrievable. On mounting of the support 10 around the support bearing 4 of the rim 2 and by reason of the great stiffness of the reinforcing structure 11 on extension and its weak bending strength, the structure 11 will be polygon-shaped around the bearing 4 (see FIG. 4). The base 8 of the support is thus in indirect contact with the bearing 4 of the rim 2 by means of the 6 protuberances 12 and in direct contact with the zones arranged circumferentially between two protuberances 12. The inner effective radius of the base 8 (in practice, equal to $2R_A$) therefore varies appreciably between the radius of the bearing 4 and that radius plus twice the radial height of the protuberances 12 compressed. Mounting of the support 11 around the bearing 4 is thus possible with very limited stresses, due only to the friction of the protuberances on the bearing, to the compression of the protuberances 12 and to the bending of the base 8 of the support in order to be polygon-shaped. That mounting is carried out, in practice, without it being necessary to stretch the structure 11 circumferentially. Such an extension would require stresses much too great for that to be possible.

Figure 5:
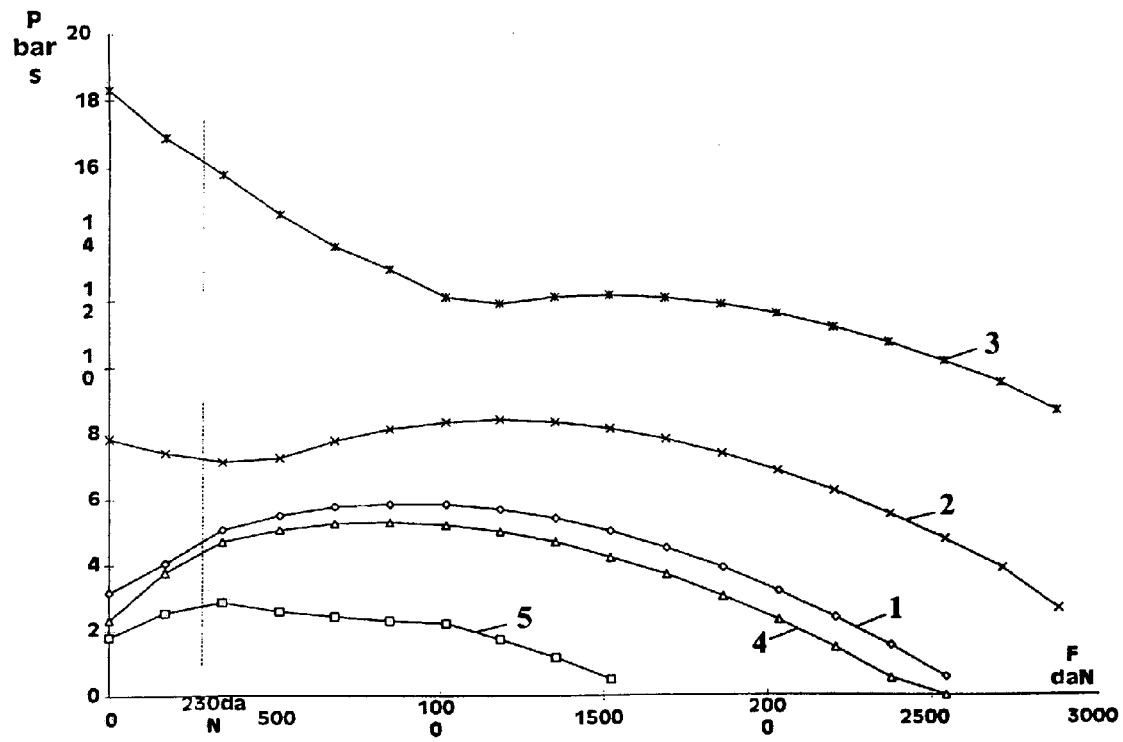
FIG. 5 presents the evolution of the bearing pressure of the protuberances of the support of FIGS. 2 and 3 on the rim bearing as a function of centrifugal forces.

The second role of the protuberances is illustrated by a digital simulation made for a rubber support 117 mm wide, 50 mm high and of 220 mm inner radius. The base of this support contains protuberances 3 mm high arranged over the whole width of the support and 20 mm in circumferential length. The curves of FIG. 5 present the evolution of the support pressure (P in bars) of the protuberances 12 against the bearing 4 of the rim 2 as a function of the centrifugal forces (F in daN) for a support section of 10 mm axial width.

The total weight of the support is 4 kg.

Figure 4:
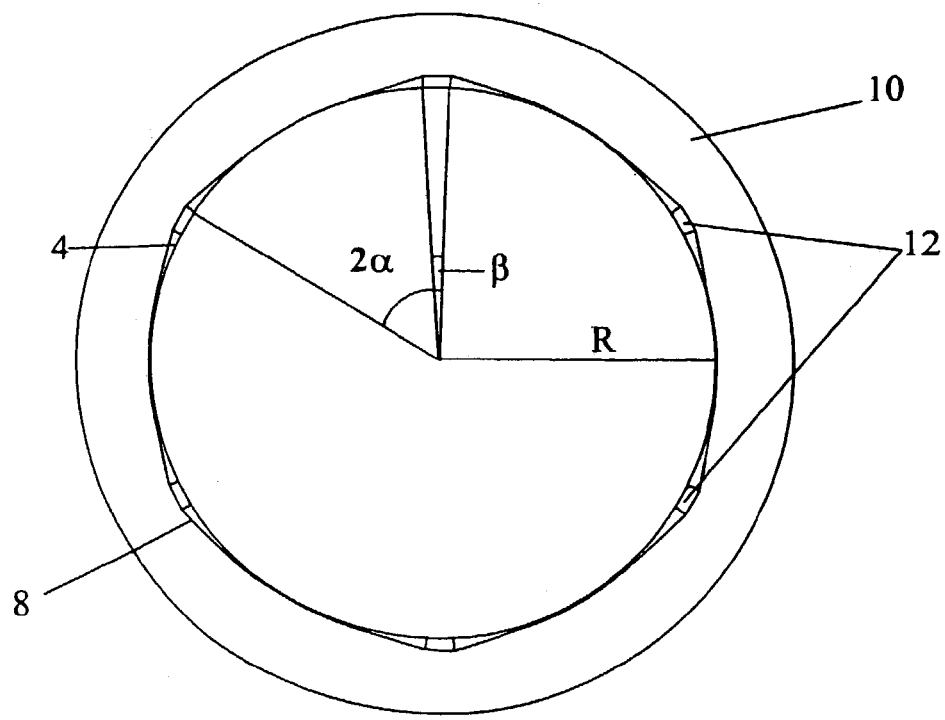
FIG. 4 presents the support of FIG. 3 mounted on a rim bearing.

The simulation considers for a given reinforcement radius 11 $R_A$ several radii of the support bearing of the rim 2:
- R=$R_A$–1.35 mm; curve 1—in this case the development of the reinforcement 11 corresponds exactly to the development of the polygon illustrated in FIG. 4;
- R=$R_A$–1 mm; curve 2;
- R=$R_A$–0.5 mm; curve 3;
- R=$R_A$–1.5 mm; curve 4; and
- R=$R_A$–2 mm; curve 5.

After mounting, at zero speed, the support pressure of the protuberances 12 on the bearing 4 is directly linked to the radius of the bearing 4. For curves 1, 4 and 5 that initial pressure can be considered the result of the compressive stresses of the protuberances, balancing the stresses linked to bending of the base 8 on its polygon formation. For curves 2 and 3 the stresses increase appreciably by reason of the need for a much greater compression of the protuberances 12.

When the centrifugal forces increase, it can be observed on curves 1, 4 and 5 that the support pressure of the protuberances 12 on the bearing 4 very appreciably increases to a maximum. The support pressure then drops to a zero value. This evolution is linked to the increase of stresses applied to the structure 11 due to the centrifugal force of the support, which will result in an elongation of the structure as well as a modification of the geometry of the latter, tending to become circular again. The increase of stresses on the polygon-shaped structure implies an increase of compressive stresses of the protuberances and the progressive elongation of the structure entails a reduction of that compression. The presence of the maximum must be linked to the combination of these two phenomena. When the structure 11 has become circular and has a development roughly equal to R+h, the compressive stresses of the protuberances become nil. It is to be noted that the speed of rotation corresponding to that state is, in all of the cases considered, the support comprising a structure 11 consisting of three windings of a ply of aramide circumferential reinforcements, greater than 400 km/h. The centrifugal force value equal to 230 daN corresponds to a speed in the order of 170 km/h.

In the case of curves 2 and 3, one encounters an initial reduction of pressure of the protuberances, followed by the evolution previously described.

The above mentioned curves illustrate that the protuberances, thanks to the polygon formation of the structure that they induce on mounting, make it possible to obtain sufficient centering stresses in a very wide range of speeds in order to preserve good centering of the support, without unbalance, while having an easy mounting of the support.

The use of such protuberances is possible as long as the bending strength of the base 8 of the support is well below its extension strength. This is entirely the case with the supports made of elastomeric materials with appreciably inextensible reinforcements placed in their bases. The support 10 is preferably made of an elastomer material of modulus of elasticity, with 10% deformation and a temperature of 20 degrees Celsius, ranging between 1 and 50 MPa. This material can be a diene elastomer, such as natural or synthetic rubber, or a polyurethane elastomer.

When a support does not contain a reinforcing structure in its base, the role of the protuberances on insertion of the support on the rim bearing remains similar, but, of course, the evolution of the compressive stresses of the protuberances as a function of speed can vary with the modulus of elasticity of the materials used.

FIG. 4 makes it possible to specify the relation that the height of the protuberance must satisfy in order to obtain maximum efficiency. On polygon formation of the base around the support bearing of a rim, between two adjacent protuberances, the base must maintain a zone of direct contact with the support bearing.

That state corresponds to the following relation: $\alpha$ being the half-angle in the center separating two adjacent protuberances, and R being the radius of the support bearing 4 of the rim 2, the height of a protuberance satisfies:

$$h \leq R\left(\frac{1}{\cos\alpha} - 1\right)$$

When the protuberances are regularly distributed on the circumference of the base 8, $\beta$ being the angle in the center corresponding to a protuberance and N the number of protuberances, one obtains the relation:

$$\alpha = \frac{\pi}{N} - \frac{\beta}{2}$$

The two foregoing relations show that, in order to take up a given play, the number and height of the protuberances can be varied at the same time.

Figure 6:
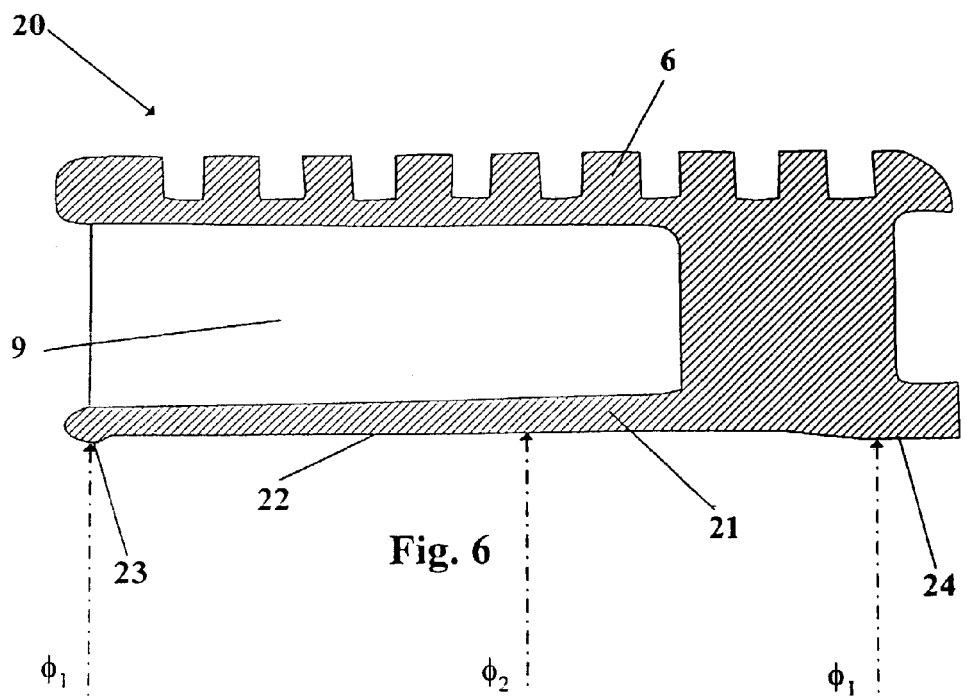
FIG. 6 presents an axial section of a second embodiment of a support.

FIG. 6 presents another embodiment of a support 20 according to the invention. The section presented is situated at an azimuth different from those of the protuberances. This support comprises, as previously, a body 9 with a crown 6 and a base 21. The base 21 includes a circumferential recess 22, the radius $\Phi_2$ of which is greater than $\Phi_1$ of zones 23 and 24 which are adjacent to it.

This makes it possible to limit very appreciably the frictional stresses between the base of the support and the support bearing 4 on mounting and demounting.

Figure 7:
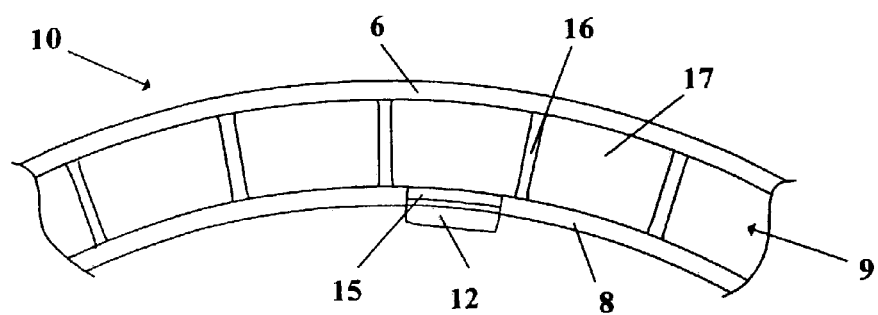
FIG. 7 presents a side view of a support according to the invention.

FIG. 7 presents a side view of the support 10 of FIG. 2. The body 9 of that support includes junctions 16 which join the base 8 and the crown 6. These junctions define cavities 17 between them. FIG. 7 illustrates a preferred arrangement of the protuberances 12 opposite the cavities 17 of the body 9.

This arrangement makes it possible not to have to increase, opposite the protuberances, the radial stiffness of the support, which limits the stress variations undergone by the support upon running on support and thus improves its endurance. It has, in fact, been observed that, if the protuberances are placed opposite a junction 16, damages on operation of that support primarily develop in that spot.

Figure 8:
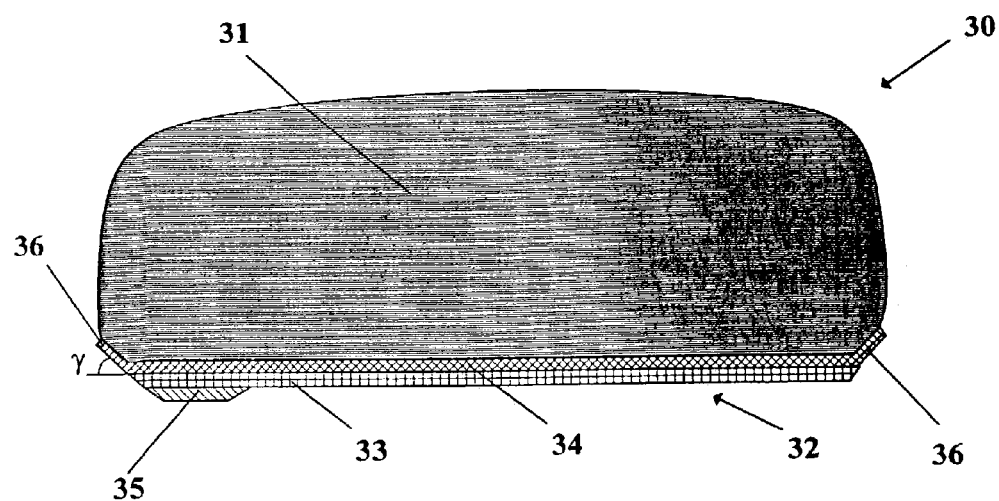
FIG. 8 presents an axial section of another support according to the invention.

FIG. 8 presents in axial section a support 30 according to the invention, the body 31 of which consists of a roll of cellular rubber with closed cells. This support comprises the body 31, a base 32 containing a first structure of annular reinforcements 33 and a second structure of reinforcements 34 oriented perpendicular to the circumferential direction. The base 32 is extended, axially on both sides, by wings 36. These wings have an inclination y in relation to the axial direction ranging between 30 and 50 degrees. The wings 36 can contain only the reinforcing structure 34. These wings 36 are glued to the body 31 and favor its lateral hold on running inflated at high speed. The base 32 and the body 31 are glued with the usual adhesives. The base 32 includes a set of protuberances 35 arranged radially inward on the surface of the base 32. The operation of those protuberances is identical to that previously described.

Figure 9A:
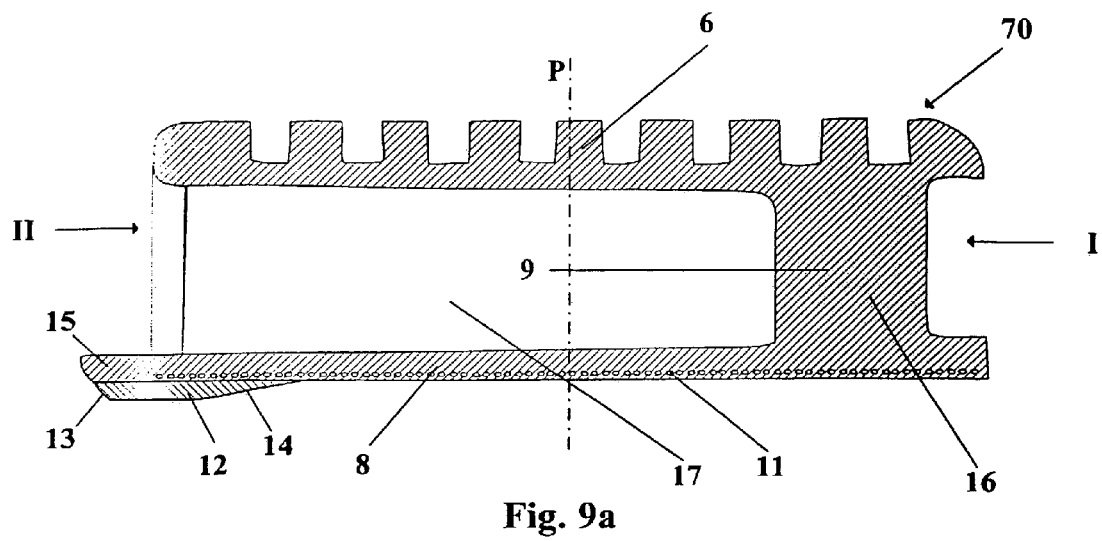
FIGS. 9*a* and 9*b* present two axial sections of another support of the invention taken in two different axial planes.
Figure 9B:
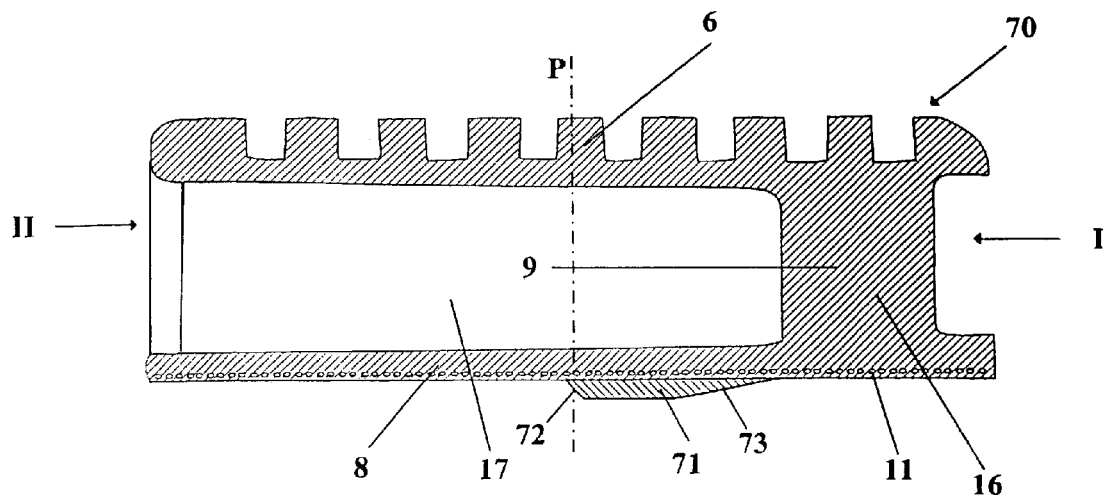

FIGS. 9a and 9b present two axial sections corresponding to two different axial planes of a support 70 according to the invention, which comprises two sets of centering protuberances 12 and 71. The two sets are axially offset, the first 12, as previously, being placed on the side opposite the first side in contact with the rim support bearing 4. The second set 71 is placed on the other side of the mid-equatorial plane. The protuberances of the second set 71 are also circumferentially offset relative to those of the first set 12. This is intended to create, upon running on support, an alternate contact on both sides of the mid-equatorial plane, which produces vibrations similar to a camber movement that can be easily detected either by the driver or by an appropriate device. The protuberances 12 and 71 have sections identical with the first biases 14 and 73 designed to facilitate insertion of the support around the bearing 4 of the rim and the second biases 13 and 72 designed to facilitate demounting of the support.

Figure 10:
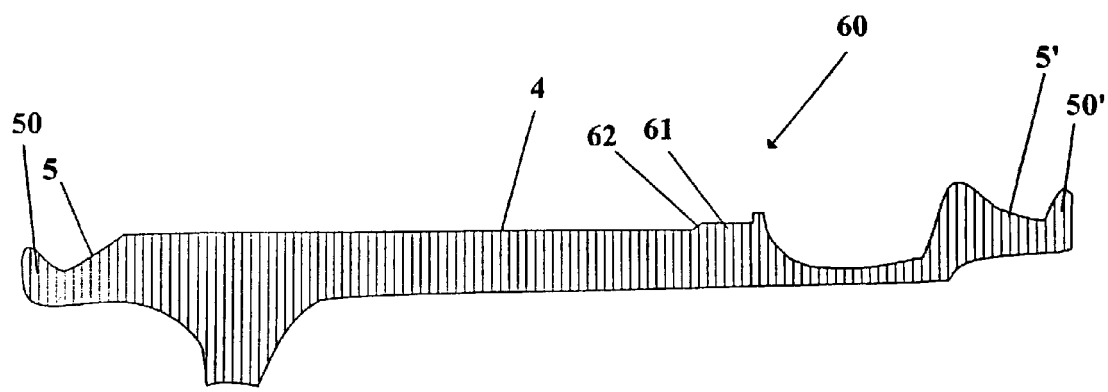
FIG. 10 presents an axial section of a rim according to the invention.
Figure 11:
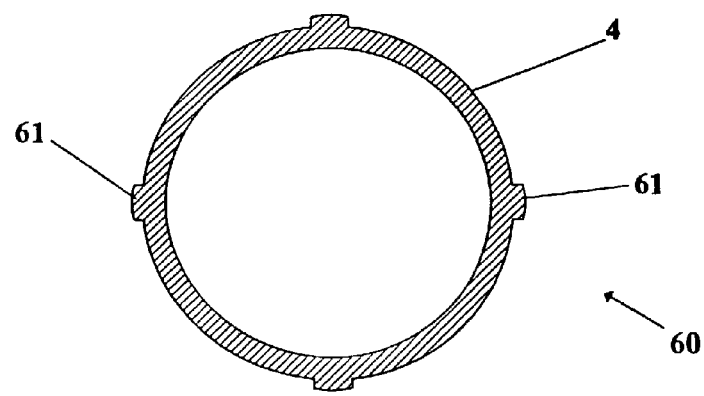
FIG. 11 present a section in an equatorial plane of the rim of FIG. 10.

FIGS. 10 and 11 present a rim 60 according to the invention. This rim has a geometry very similar to that of FIG. 1, except for the fact that the bearing 4 of that rim includes protuberances 61 regularly distributed circumferentially. In the example presented those protuberances are placed in the zone of the bearing 4 which is last in contact with a safety bearing such as 3. The function of those protuberances is identical to those arranged under the base of the supports, except, of course, for the fact that those protuberances 61 are not compressible. They preferably include a bias 62 to facilitate insertion of the support 3. As FIG. 11 shows, the protuberances 61 are regularly distributed over the circumference of the bearing 4, as previously. FIG. 11 is an equatorial section of the rim 60 crossing the protuberances 61.

We claim:

1. A wheel assembly comprising a rim and a pneumatic vehicle tire safety support, said support being designed to be installed inside a tire by a relative translation operation around a bearing of said rim, having an axially front face and an axially back face and comprising a base intended to fit around said bearing as well as a body connected to said base, said bearing having an engagement edge and said translation operation comprising moving the engagement edge of the rim bearing from said axially front face of the support to said axially back face, wherein said assembly comprises a plurality of circumferentially distributed protuberances said protuberances being arranged on a portion of said rim bearing and having a radial dimension greater than a radial dimension of a remainder of said rim bearing disposed beneath said support in a radially inward direction, in order to create a mechanical tightening between said support and said bearing and to provide centering of said support on said bearing, wherein said base of said safety support comprises a reinforcing structure and said reinforcing structure has stiffness in response to extension forces and weak bending strength, so as to have a substantially polygonal shape over said protuberances.

2. An assembly according to claim 1, in which each of said protuberances possesses in section through an axial plane at least one radially outer profile portion whose distance from the axis of the rim gradually increases in the axial direction from the side of the engagement edge of the bearing to the opposite side from a value less than the inner radius of the base of said support to a value exceeding that radius, in order to permit frictional engagement between the rim and the base of the support.

3. An assembly according to claim 1, wherein said reinforcing structure comprises a reinforcing ply.

* * * * *

UNITED STATES PATENT AND TRADEMARK OFFICE
CERTIFICATE OF CORRECTION

PATENT NO. : 7,287,564 B2  
APPLICATION NO. : 10/462284  
DATED : October 30, 2007  
INVENTOR(S) : Jean-Pierre Pompier et al.

Page 1 of 1

It is certified that error appears in the above-identified patent and that said Letters Patent is hereby corrected as shown below:

[56] REFERENCES CITED

Foreign Patent Documents  
    "FR 2588802   4/1987" should be deleted.

COLUMN 10

Line 10, "protuberances" should read --protuberances,--.

Signed and Sealed this

Seventeenth Day of March, 2009

JOHN DOLL  
*Acting Director of the United States Patent and Trademark Office*